US007656285B2

(12) United States Patent
Hansen et al.

(10) Patent No.: US 7,656,285 B2
(45) Date of Patent: Feb. 2, 2010

(54) METHOD AND APPARATUS FOR COMMUNICATING THE EXISTENCE OF AN EMERGENCY SITUATION WITHOUT UNIQUELY IDENTIFYING THE SOURCE OF THE COMMUNICATION

(75) Inventors: Kim Johnnie Hansen, Renton, WA (US); Carlton B. Morgan, Bainbridge Island, WA (US); Thomas Dean Lyster, Bothell, WA (US)

(73) Assignee: Koninklijke Philips Electronics N.v., Eindhoven (NL)

( * ) Notice: Subject to any disclaimer, the term of this patent is extended or adjusted under 35 U.S.C. 154(b) by 518 days.

(21) Appl. No.: 10/598,015

(22) PCT Filed: Feb. 2, 2005

(86) PCT No.: PCT/IB2005/050442

§ 371 (c)(1),
(2), (4) Date: Aug. 16, 2006

(87) PCT Pub. No.: WO2005/083649

PCT Pub. Date: Sep. 9, 2005

(65) Prior Publication Data

US 2008/0151972 A1 Jun. 26, 2008

Related U.S. Application Data

(60) Provisional application No. 60/545,821, filed on Feb. 19, 2004.

(51) Int. Cl.
*G08B 23/00* (2006.01)
*G08G 1/00* (2006.01)
*H04B 3/36* (2006.01)

(52) U.S. Cl. .................... 340/500; 340/425.1; 340/902; 340/904; 340/539.1; 340/538.11; 455/404.1; 375/211

(58) Field of Classification Search ................. 340/500, 340/425.1
See application file for complete search history.

(56) References Cited

U.S. PATENT DOCUMENTS

| | | | | |
|---|---|---|---|---|
| 4,251,808 | A | 2/1981 | Lichtblau | |
| 5,926,103 | A | 7/1999 | Petite | |
| 6,839,539 | B2 * | 1/2005 | Durrant et al. | 455/11.1 |
| 6,970,496 | B1 * | 11/2005 | Ben-Bassat et al. | 375/141 |
| 7,151,913 | B2 * | 12/2006 | Ahmed | 455/91 |

FOREIGN PATENT DOCUMENTS

| | | | |
|---|---|---|---|
| GB | 2 238 930 | A | 6/1991 |

* cited by examiner

*Primary Examiner*—Donnie L Crosland

(57) ABSTRACT

A system in which one or more alarm sources (10), can wirelessly communicate with a receiver (30), to activate an alarm and does not contain any identification that indicates the communication's source (10). The system may include "repeaters" (40), whose function is to relay the communication from one station to another over distances longer than can be reached by a single transmitter (10), Apparatuses for transmitting (10), repeating (40), and receiving (30), are also disclosed, as well as a communication system comprised of various elements of these.

24 Claims, 6 Drawing Sheets

METHOD AND APPARATUS FOR COMMUNICATING THE EXISTENCE OF AN EMERGENCY SITUATION WITHOUT UNIQUELY IDENTIFYING THE SOURCE OF THE COMMUNICATION

CROSS REFERENCE TO RELATED APPLICATION

This application claims the benefit of U.S. provisional application Ser. No. 60/545,821 filed Feb. 19, 2004, which is incorporated herein by reference.

DESCRIPTION

The present invention relates generally to methods and apparatuses for communicating, and more particularly to a method and apparatus for communicating in an emergency situation.

Present personal emergency response systems (e.g., Lifeline, etc.) and wireless security systems typically operate in the unlicensed electromagnetic spectra allocated by various regulatory bodies. Because this spectrum is available to any number of manufacturers and their devices, there is a need to identify the source of a particular transmission to prevent a garage remote control from activating the emergency response system. Typically, this identification is accomplished by sending a predetermined digital identification code, which the receiver will recognize and to which the receiver will respond. All other identification codes are ignored. These identification codes increase the amount of information that must be sent through the channel, which in turn places complexity burdens on the transmission link, as well as on the design of the transmitter identification function and as such, must have a robust link to operate successfully.

Repeater systems, those that relay signals from station to station to increase the effective range of the overall system, must include additional information to identify their transmission as a copy of the original to prevent endless repeater loops from developing. Without this identification, the following scenario can develop. Repeater station A receives an unidentified transmission, waits until it concludes, then retransmits it without appending identification codes. Repeater station B receives the transmission from station A, waits until it concludes, then transmits it, again devoid of identification coding. Because station A is within range of station B, station A will again receive the unidentified transmission and will dutifully rebroadcast it, and upon receipt it will be repeated by station B. This will result in nearly continuous bouncing of the transmission between the two stations and will effectively consume the bandwidth of the channel, perhaps to the point of prohibiting any other original communication. To avoid this, repeater systems typically add identification information to communications that they retransmit. This way, station A can recognize that it has already transmitted the message it received from station B and thus suppresses transmitting station B's relay.

Moreover, things get increasingly complex, however, as the number of repeater stations increases.

The present invention is therefore directed to the problem of developing a method and apparatus for reducing the complexity in an emergency response communications system.

The present invention solves this and other problems by providing a system in which one or more alarm sources can wirelessly communicate with a receiver to activate an alarm. The communication does not contain any identification that indicates the communication's source. The system may include "repeaters" whose function is to relay the communication from one station to another over distances longer than can be reached by a single transmitter.

According to one aspect of the present invention, an exemplary embodiment of a method for communicating an emergency signal includes one or more of the following: varying a repetition rate of an unmodulated longwave carrier in an on/off keyed manner in a predetermined sequence and a predetermined phase angle; generating an electromagnetic wave with a resulting signal in which a primary propagation mode is via magnetic field and which has a reduced electric field; and transmitting the resulting signal as the emergency signal. The exemplary embodiment may also include monitoring one or more transmissions at a predetermined frequency for the predetermined sequence; and activating an alarm system upon determining a match of the predetermined sequence in one of the one or more transmissions.

According to another aspect of the present invention, an exemplary embodiment of a method for communicating an emergency signal includes one or more of the following: transmitting an alarm sequence as a repeating predetermined on/off sequence of a predetermined frequency and a predetermined phase angle using a magnetic field as a primary mode of propagation and with a reduced electric field; identifying by one or more repeaters the alarm sequence; synchronizing the one or more repeaters to the alarm sequence; rebroadcasting the alarm sequence from the one or more repeaters in synchronism with a source of the alarm sequence; activating an alarm response system upon determining a match of the predetermined sequence in one of the one or more transmissions; transmitting a response to the alarm sequence upon receipt by an emergency response system; and resetting one or more repeaters and a source transmitter upon receipt of the response.

According to still another aspect of the present invention, an exemplary embodiment of an apparatus for transmitting an emergency signal includes a signal generator, a switch and a shielded antenna. The signal generator generates a carrier signal at a predetermined longwave frequency and a predetermined phase angle. The switch is coupled to the signal generator and interrupts the carrier signal or turns the signal generator on and off in a predetermined sequence and at the predetermined phase angle. The antenna is coupled to the switch and radiates the interrupted longwave carrier signal in the predetermined sequence and predetermined phase angle as the emergency signal using a magnetic field as a primary mode of propagation and with a reduced electric field.

According to yet another aspect of the present invention, an exemplary embodiment of an apparatus for receiving an emergency signal includes a shielded antenna, a receiver and a processor. The shielded antenna generates a current primarily from a changing magnetic field and not from an electric field. The receiver monitors a predetermined longwave frequency and produces a digital sequence upon receiving a transmission at the predetermined longwave frequency, which digital sequence represents an on/off sequence detected at the predetermined longwave frequency. The processor correlates the digital sequence against a predetermined sequence to identify the emergency signal.

According to another aspect of the present invention, an exemplary embodiment of the receiver includes an antenna, a tuning capacitor, a transformer, an amplifier, a detector and a converter. The antenna converts received energy in a changing magnetic field (and not an electric field) at the predetermined longwave frequency to an electrical signal. The transformer is coupled to the antenna and provides voltage gain while at the same time reducing the Q of the antenna without adding real resistance (which would add undesirable noise to the signal). The tuning capacitor tunes a complex impedance to the antenna and the transformer of the receiver to develop a resonant circuit. The amplifier is coupled to the transformer and amplifies a signal output by the transformer. The detector is coupled to the amplifier to detect an envelope of the amplified transformer output signal. The converter converts the detected signal output by the detector to the digital sequence. A shield may be disposed around at least the antenna to shield the antenna from electric fields. While the above uses terms familiar to those in conventional analog radio, the detection and conversion can be accomplished in the digital domain, in which case the radio includes an antenna, a tuning capacitor, a transformer, an amplifier, an A/D converter, and a digital signal processor or other general purpose computing device, although in which case compute delays must be accounted for to maintain transmissions in lockstep.

According to still another aspect of the present invention, an apparatus for repeating an emergency signal includes a receiver, a transmitter and a synchronizer. The receiver monitors a predetermined longwave frequency and outputs a digital sequence upon receiving a transmission on the predetermined longwave frequency, which digital sequence represents an on/off sequence detected at the predetermined longwave frequency. The receiver includes a processor to correlate the received digital sequence against a predetermined sequence to identify the emergency signal. The transmitter includes a shielded antenna, a signal generator and a switch. The signal generator is coupled to the processor to generate a carrier signal at the predetermined longwave frequency and at a predetermined phase angle upon an identification of the emergency signal by the processor. The switch is coupled to the signal generator and interrupts the carrier signal or turns the signal generator on and off in the predetermined sequence and at the predetermined phase angle. The synchronizer is coupled to the switch and synchronizes the predetermined sequence generated at the output of the switch with the received digital sequence. This synchronization is with respect to both time and phase to prevent phase cancellation. The transmitter includes an antenna coupled to the switch to reradiate the predetermined signal in the predetermined sequence and predetermined phase angle as the emergency signal using a magnetic field as a primary mode of propagation as opposed to an electric field.

According to still another aspect of the present invention, an exemplary embodiment of a communication system for communicating an emergency signal includes the above apparatus for transmitting, the above apparatus for receiving and perhaps, one or more of the above apparatuses for repeating.

Other aspects of the present invention will be apparent to those of skill in the art upon reviewing the detailed description in light of the following drawings.

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention seeks inter alia to simplify the entire emergency response communication system based upon the premise that in an emergency situation in which help must be summoned, initial identification of the precise source of the emergency is not important. It matters only that the alarm be communicated and help be contacted. Once contacted, the source and nature of the emergency can be determined and assistance dispatched appropriately.

The need to distinguish between a valid alarm condition and interference from other transmission sources, however, still exists. To accomplish this, the present invention relies on the fact that the information content in its message is exceptionally low (i.e., a call for help) and uses that fact to provide a very simple coding scheme that will permit the receiver to distinguish between random noise or interfering transmissions and actual alarms.

Figure 1:
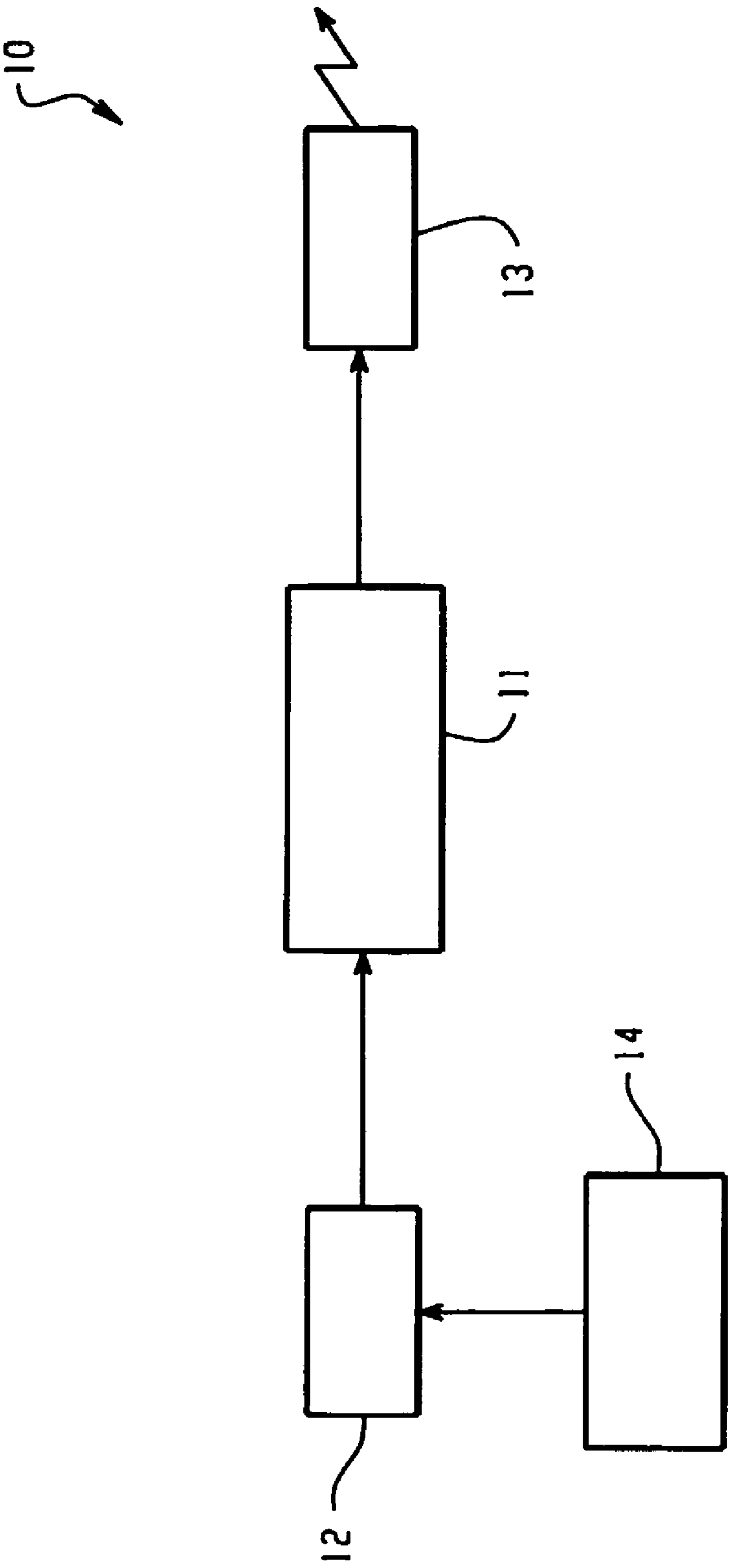
FIG. 1 depicts an exemplary embodiment of a transmitter for use in the communications system of the present invention according to one aspect of the present invention.

Turning to FIG. 1, shown therein is an exemplary embodiment of a transmitter for transmitting an emergency signal or beacon according to one aspect of the present invention. The exemplary embodiment of the transmitter 10 includes a signal generator 11 that generates a signal having a predetermined longwave frequency. It should be noted that while signal generator 11 generates the "carrier" signal, the actual carrier signal frequency would be determined by the on/off rate of the switch. The nature of this frequency will be discussed later. The signal is then "modulated" in an ON/OFF keyed manner in a predetermined sequence and at a predetermined phase angle (e.g., zero phase) by, e.g., using a sequence generator 14 that drives a switch 12, which creates an output from the carrier signal generator 11 that consists of the carrier signal keyed on and off in a predetermined pattern. The nature of the pattern will be discussed later. The resulting signal is output to an antenna 13, which in turn radiates the signal modulated in an ON/OFF pattern with a predetermined phase angle. The antenna 13 can be any antenna suitable for the selected frequency. A preferential implementation of the antenna 13 includes a loop antenna, but many others are also possible without departing from the scope of the invention. The antenna is designed to propagate the resulting signal using a magnetic field as a primary mode of propagation (as opposed to an electric field, which is intentionally reduced to limit the range of the transmission). While the above implementation shows the signal generator being coupled to the antenna, the carrier generator could be coupled via the switch to the carrier generator, which switch is opened and closed in accordance with the predetermined pattern, thereby generator the desired on/off keyed (OOK) signal.

Figure 2:
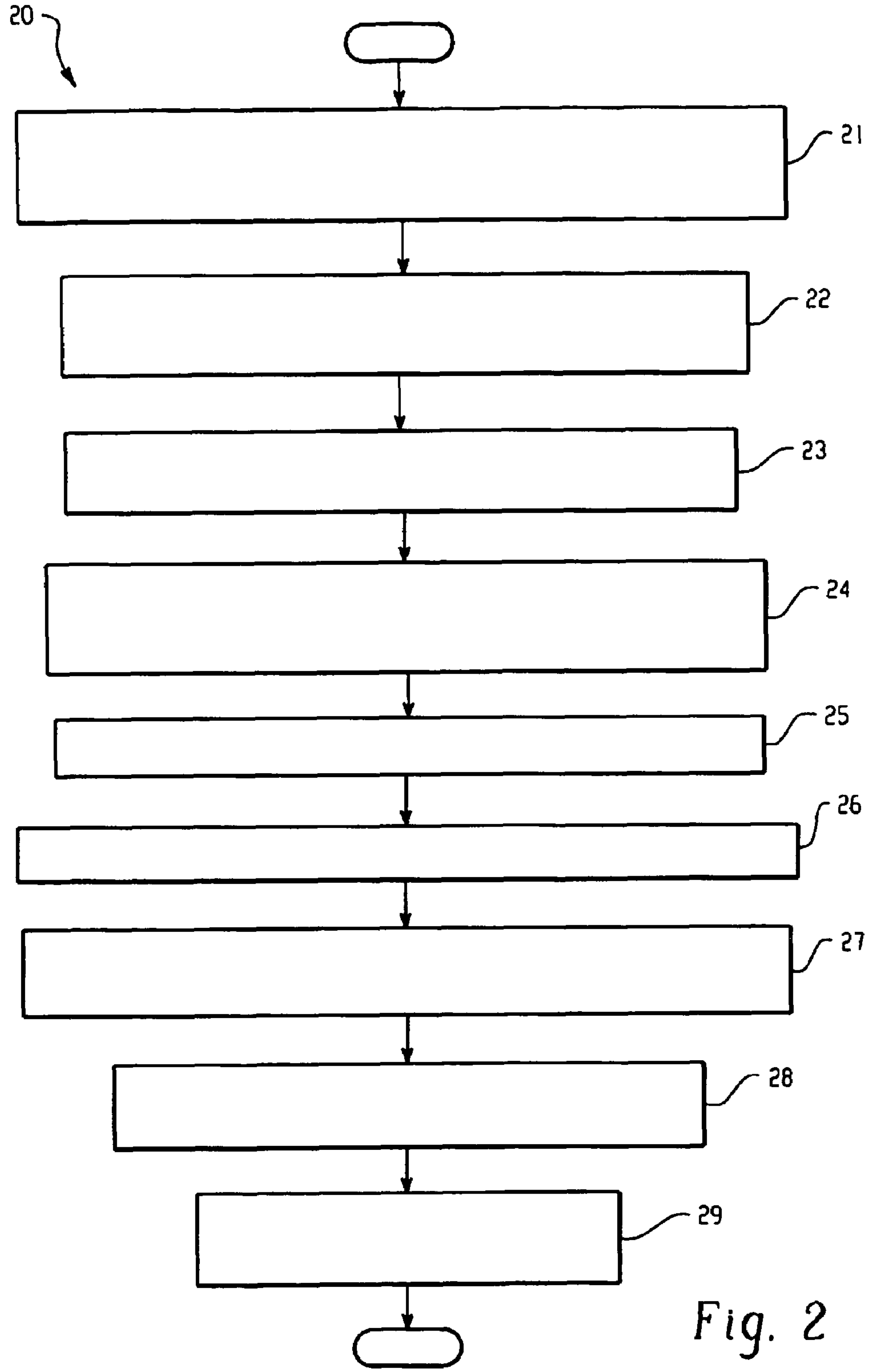
FIG. 2 depicts an exemplary embodiment of a method for communicating an emergency signal according to another aspect of the present invention.

According to another aspect of the present invention, an exemplary embodiment of a method for communicating an emergency signal is shown in FIG. 2. This method 20 communicates the fact that an emergency situation exists. The embodiment 20 accomplishes the coding scheme discussed above to transmit this simple fact by varying the repetition rate of a "carrier only" (unmodulated) on/off keyed (OOK) transmission at a specified rate and in a specified pattern (step 21). The exact specified rate and exact pattern are not important other than that they are known to any potential receivers. For example, the scheme that identifies a valid alarm may require that OOK transmissions occur at a repetition rate of 40 Hz for one second, then switch to a repetition rate of 50 Hz for ⅓ second then switch to a repetition rate of 30 Hz for ½ second, then nothing (i.e., no transmission) for ¾ second. The cycle would then repeat until reset. The phase angle of the signal is controlled so that the phase begins at the same point in phase (such as zero or ninety degrees) each time the pulse begins.

In step 22, an electromagnetic wave is generated with a resulting signal in which a primary propagation mode is via magnetic field and which has a reduced electric field. The electric field is intentionally reduced to limit the range of the transmission, as well as to avoid interference caused by any application in which electric fields could be problematic. The end result is then transmitted as the emergency signal.

In step 23, a receiver monitors transmissions at the designated frequency for this pattern of repetition rates. Thus, a potential receiver monitors the designated frequency for transmissions and attempts to match any received transmissions against the known transmitter repetition rate and pattern.

Figure 6:
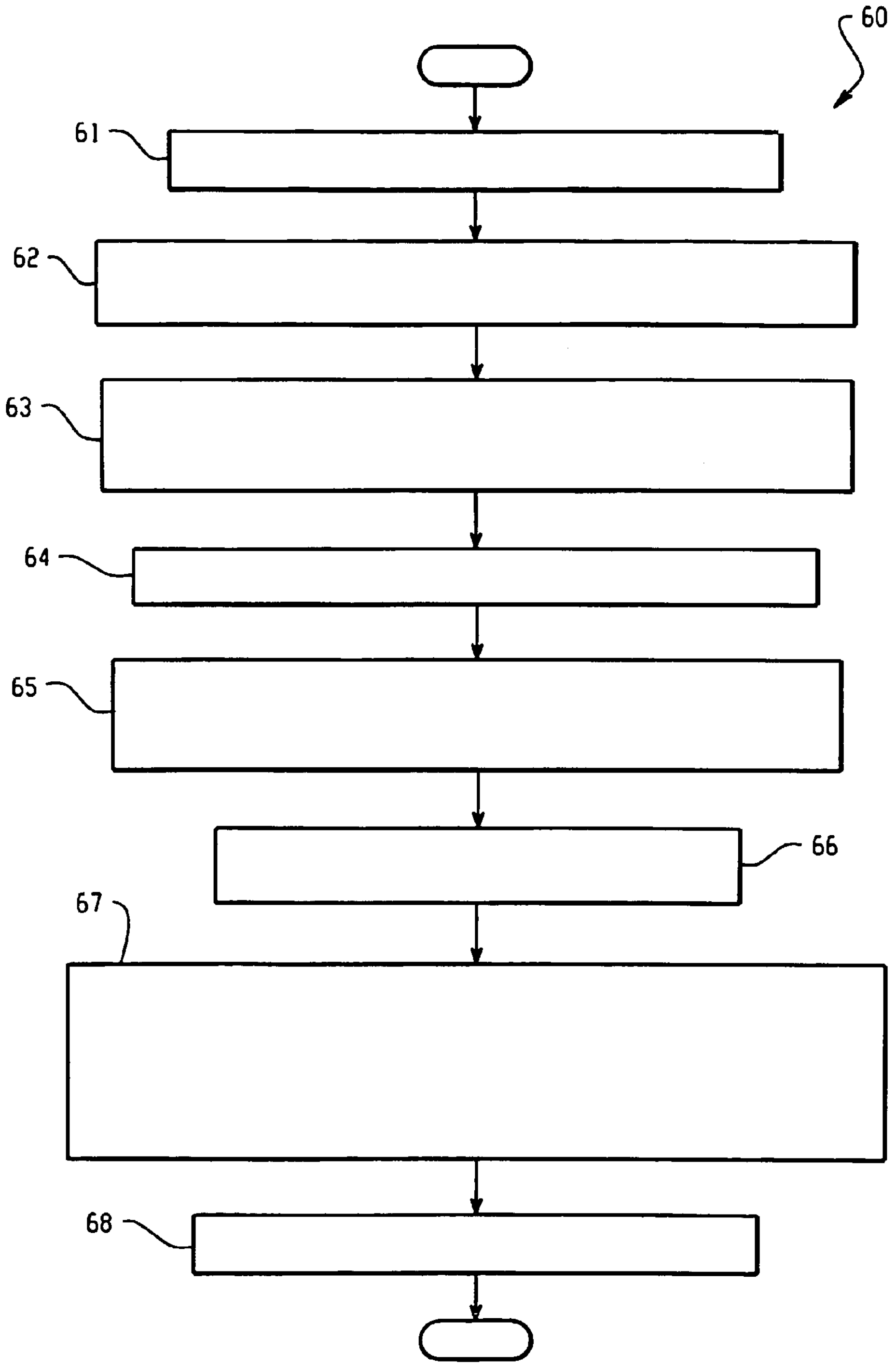
FIG. 6 depicts an exemplary embodiment of a monitoring step in the method of FIG. 2 according to still another aspect of the present invention.

FIG. 6 depicts an exemplary embodiment 60 of the steps to perform the monitoring step 23 according to another aspect of the present invention.

In step 61, the alarm sequence is received using an antenna, such as a loop antenna. The specifications of the antenna can be determined once the designated frequency is known as is known in the art. The receiving antenna is shielded to prevent interference caused by electric fields, as the desired signals is being propagated via magnetic field as opposed to electric field.

In step 62, complex impedance is tuned to the loop antenna and the transformer of the receiver to develop a resonant circuit.

In step 63, a transformer is driven with an output of the antenna in a receiver to provide voltage gain while at the same time reducing the antenna Q by reflecting a real resistance from the secondary to the primary.

In step 64, a band-limited output of the transformer is amplified for further processing.

In step 65, the received alarm sequence is detected in the amplified transformer output to provide an "on/off" keyed representation of the received alarm sequence.

In step 66, the detected representation is converted to a digital representation. The steps of envelope detection and conversion to a digital representation can also be performed in the digital domain using an analog-to-digital converter and a signal processor. The result is the same in that a digital sequence is produced from the received analog waveform.

In step 67, the digital representation is processed to determine whether or not the received signals conform to the predetermined sequence that defines the alarm sequence. This processing includes correlating a duration and a period of the digital representation with the predetermined sequence and perhaps averaging to reduce random noise and consequently increase a received signal to noise ratio.

In step 68, the receiver is shielded from electric fields so that the predominant mode being transmitted (e.g., via magnetic field propagation) is also the predominant mode being received (e.g., magnetic field propagation), thereby providing additional filtering of extraneous signals.

Turning back to FIG. 2, in step 24, when the receiver determines that the pattern is matched, the receiver activates the alarm system. This enables a response to be generated and transmitted to the source of the alarm, which can activate a different communications system or which enables a message to be now modulated on the transmitted signal, if desired to provide more information about the nature of the emergency. Moreover, a transmission back to the source can be used to reset the source transmitter (and any intermediate repeaters) to end all transmissions of the original signal. In general, a wide variety of responses are possible once an emergency situation is recognized to exist.

In step 25, one or more repeaters could identify the alarm sequence, thereby enabling the source to be transmitted to a distant central location over one or more hops, depending on the nature of the specific communication system being established and the environment in which the specific communication system is being located. The number of "hops" and their exact characteristics required would be predetermined, and would factor the probability of false alarm against the sequence, so any receiver would activate the alarm system upon receipt. It does not matter if the receiver is located in a home or the local grocery store; if help is required the alarm system is activated.

In step 26, each of the one or more repeaters synchronizes to the alarm sequence. Another significant advantage of the present invention is simplification of a repeater system. Because the "encoded" alarm message is a repeating cycle of changing pulse repetition rates (or pulse durations, for example), a repeater station need only identify that the pulses it sees are indeed an alarm sequence (as in step 25), then synchronize to the sequence (step 26).

In step 27, the synchronized sequence is then rebroadcast in lockstep with the source. The fact that the source may be another repeater station is irrelevant. Since the system is dedicated to the single purpose of summoning emergency assistance, it is permissible, even advantageous, for all repeaters to rebroadcast continually until the entire system is reset (as in step 29) following the emergency response (step 28). The more transmitters involved the higher signal to noise ratio that can be achieved at the receiver.

The present invention need not consider the repeaters "stepping on each other", as the communication system does not rely on modulation characteristics to communicate the message. The alarm protocol preferably includes a programmed maximum dead space, in which no transmissions occur, so that the repeater system can be shut down should the alarm be cancelled, and to permit resynchronization of the repeater system in the event that individual timing variations among the individual repeaters has caused synchronization to be compromised.

Ideally, the transmission system can be chosen to reduce or eliminate other potential sources of interference. This would tend to steer an implementation away from the popular unlicensed RF bands. The desire to remain wireless requires examination of all regions of the electromagnetic spectrum, from long wavelength IR to RF as the transmission frequency, however, the present invention could be implemented using pressure waves in air (i.e., sonic waves), for example.

Nevertheless, one exemplary embodiment of the communication system employs a transmission signal having a frequency in the lower frequency ranges, where the system relies on the fact that a poorly matched antenna (from a wavelength perspective) will make the predominate radiation mechanism a magnetic field. Radiating predominantly a magnetic field (as opposed to an electric field) has advantages in limiting the range of the transmission because the magnetic field strength falls off as the cube of the distance from the transmitter. In contrast, electric fields fall off as the square of the distance, so typically transmissions having predominantly electric fields are preferred for long-range transmissions.

Employing long wavelengths and limiting the range combine to significantly reduce multipath cancellation that generates difficult to predict nulls in the received signal strength, thus increasing the probability that a particular signal will be strong enough to provide an adequate signal to noise ratio.

Additionally, the receiver can be shielded from electric fields using faraday cage techniques, thus reducing the demands on input bandwidth filtering. The point here is to attenuate the electric field without attenuating the magnetic field. Thus, as shown in FIG. 3, the receiver 30 includes a shield 37.

As such, the preferred embodiment of the invention is to operate the transmission in the hundreds of kilohertz frequency range, such as from about 10 kHz to about 1000 kHz. Specific frequencies could be assigned to nearby regions that employ different emergency response systems so that only one communication system would be activated at a time. Operating at these low frequencies improves the "mismatch" between wavelength and the physical length of the antenna, thus favoring the propagation of magnetic fields over electric.

As shown in FIG. 1, the source transmitter 10 is then composed of an antenna 13, designed to maximize the generated magnetic field. The antenna 13 is driven at the chosen "carrier" frequency (by carrier generator 11), in an on and off pattern that complies with the established pulse repetition rate signature of the alarm indication. The sequence generator 14 controls the switch 12 to interrupt the carrier signal output by the signal generator 11 or to turn the signal generator on and off in the desired pattern. The transmitter shown in FIG. 1 can also be used as a transmitter in a repeater, as discussed below.

Figure 3:
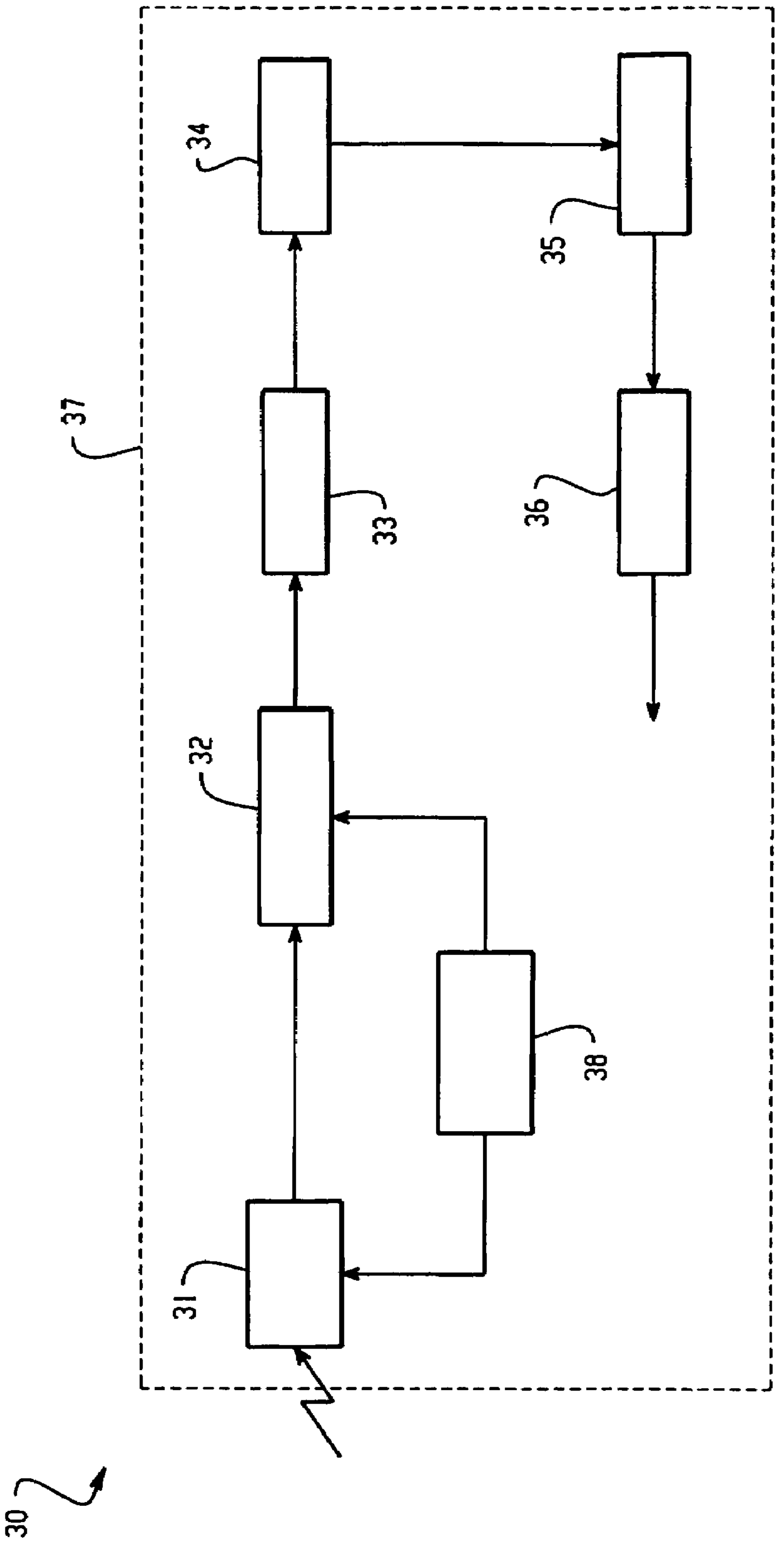
FIG. 3 depicts an exemplary embodiment of a receiver for use in the communications system of the present invention according to yet another aspect of the present invention.

Turning to FIG. 3, shown therein is an exemplary embodiment of a receiver 30 to receive the signal being transmitted by the transmitter 10. Each receiver 30 also is equipped with at least one antenna, such as a multi-turn loop antenna 31 (disposed inside a shield 37), driving preferentially a transformer 32 to provide voltage multiplication as is known in the art. By tuning the complex impedance of the transformer 32 and the antenna 31 with lumped complex impedance 38 (which is a tuning capacitor, which can be in series or in parallel), resonant circuits will result that are reasonably selective in the frequency domain. In one exemplary embodiment, the lumped complex impedance comprises a series capacitor. The band-limited output is amplified by amplifier 33 and envelope detected by detector 34 to provide an "on/off" keyed representation of the transmission. This signal is then converted by converter 35 to a digital representation for signal processing that will be processed by a microprocessor 36 or other computing device to determine whether or not the received signals conform to the predetermined patterns that describe the alarm signal.

Signal processing performed by the processor 36 would consist of correlation of the duration and period of received transmissions with the predetermined patterns. Techniques such as averaging (to reduce the contribution of random noise) could be employed to increase the received signal to noise ratio.

Figure 4:
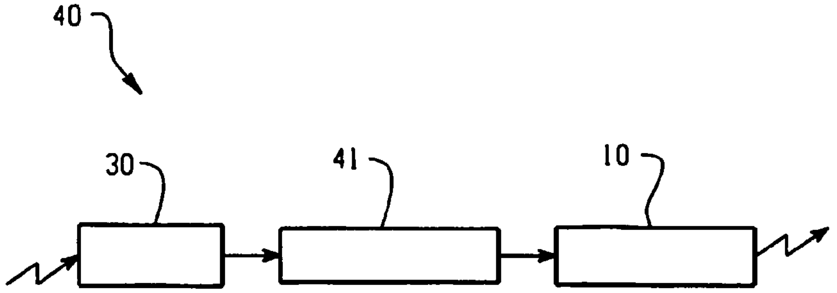
FIG. 4 depicts an exemplary embodiment of a repeater for use in the communications system of the present invention according to still another aspect of the present invention.
Figure 5:
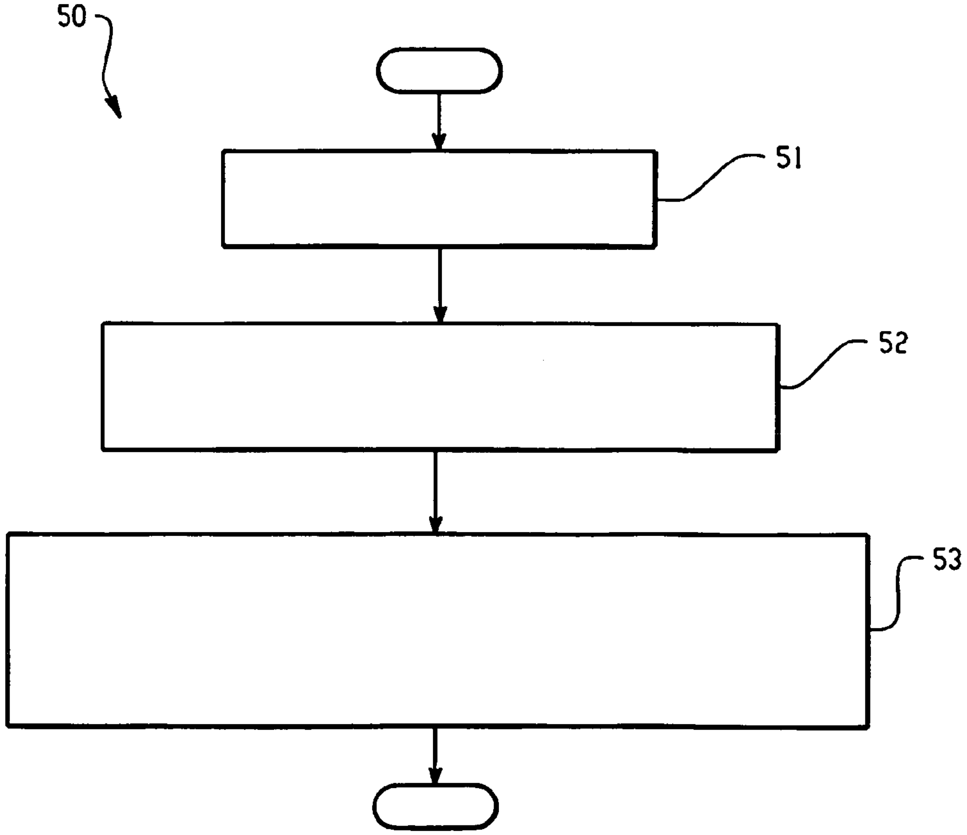
FIG. 5 depicts an exemplary embodiment of a transmitting step in the method of FIG. 2 according to yet another aspect of the present invention.

Turning to FIG. 4, shown therein is an exemplary embodiment 40 of a repeater station according to another aspect of the present invention. Repeater stations 40 will of course, retransmit the signal in lockstep with the original transmission should the pulse repetition patterns match those of an alarm. With reference to "lockstep", it is not sufficient to simply operate the switches in concert with each other; one must also ensure that each of the carrier generators are synchronized to avoid phase cancellation. This can be accomplished by actually switching the carrier generators on and off so that when each carrier generator is turned "on", the carrier starts from 0 degrees (or some other predetermined angle) phase shift. This may be simpler than trying to separately synchronize the carrier generators as well as the switch operation.

The repeater station 40 includes a receiver 30, as described above. The output of the receiver 30 (as described in relation to FIG. 3) in this case would be a decision (e.g., the alarm signal was received) as well as the pulse sequence, from which a synchronizer 41 would capture a clock signal that would in turn be used to drive the sequence generator in the transmitter 10, as described in relation to FIG. 1.

Synchronization ensures that each carrier restarts (e.g., the switch closes) at a predetermined phase shift (in this embodiment, zero degrees) thus all transmitters will operate in-phase with each other. Alternatively, one could simply switch the carrier on and off.

Ultimately, an alarm receiver (as in FIG. 3) would, upon validation of the pulse repetition pattern (i.e., a positive decision output by the receiver), perform the steps necessary to activate the emergency signaling to appropriate responders. Any number of events could then occur. In the preferred embodiment, a response signal would be transmitted so that the original source of the transmission, as well as any and all intermediate repeaters, would be turned off. Then, a subsequent communication channel could be established with the source transmitter in a variety of ways to enable communication of more information to an emergency management system, which would ultimately send the appropriate response.

Figure 7:
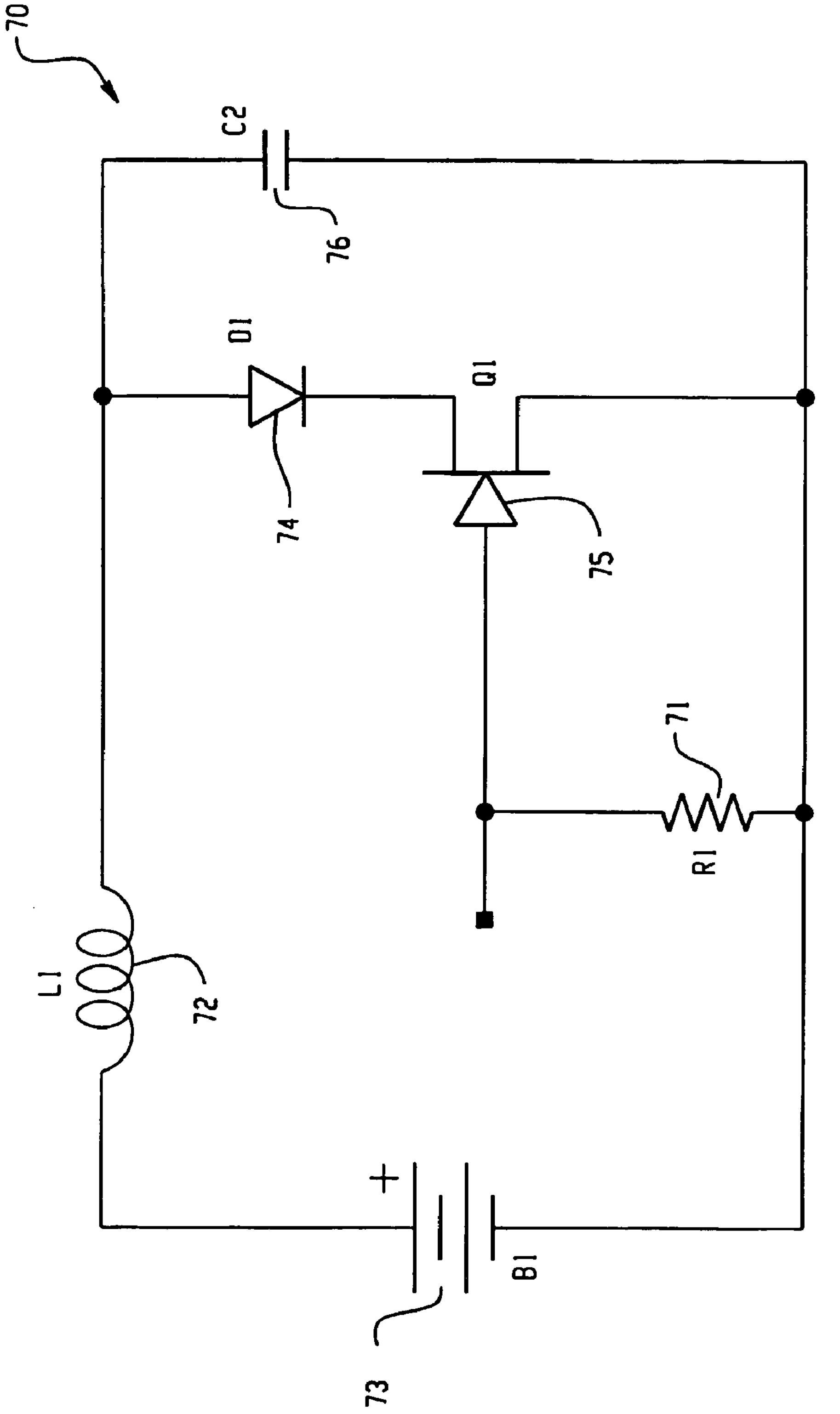
FIG. 7 depicts a circuit diagram of an exemplary embodiment of the present invention for ensuring synchronization between a source transmitter and the repeaters according to yet another aspect of the present invention.

Turning to FIG. 7, shown therein is a circuit diagram of the transmitter of the present invention, which is shown in circuit model to explain one possible technique for ensuring that the repeaters are synchronized to the source transmitter according to another aspect of the present invention. In this circuit, inductor L1 (element 72) represents the transmitting antenna. Diode D1 (element 74) keeps transistor Q1 (element 75) turned off during the predetermined off periods. Transistor Q1 is a standard N-FET transistor. Resistor R1 (element 71) provides bias for the FET 75. Capacitor C2 (element 76) is the tuning capacitor so that the circuit is resonant at around 300 kHz.

The central processing unit (CPU) (e.g., the device for generating the predetermined pattern of pulses) turns on the FET 75 for a specified period of time (e.g., 4-20 microseconds). This starts current flowing in the antenna (L1) 72 storing energy in the magnetic field of L1. At a very specific point in time the processor abruptly turns transistor Q1 75 off. This causes the L1-C2-D1 circuit to ring at the circuit's resonant frequency (300 kHz in this embodiment), with the ring starting from ground and the strength of the magnetic field produced by antenna (L1) 72 to oscillate proportional to the current flowing in L1 72. The current in L1 72 and its associated magnetic field strength will ring down based on the Q of the circuit.

Further, to ensure this synchronization one must ensure the timing of the on/off cycle on transistor Q1 75 completes at the proper time. Because the "ring" will start each pulse at the same point phase-wise (e.g., each pulse always starts from ground), then the circuit behavior is describable in the frequency domain as the convolution of the spectrum of the repeated pulses with the spectrum of the resonant circuit. As a result, the magnitude of the spectral lines is defined by the spectral envelope of the resonant circuit's "ring", but the location in frequency space of the spectral lines themselves is defined by the repetition rate, not the ring frequency. Thus, the transmission produces spectral lines spaced in the frequency domain at the desired repetition rate, but whose amplitude follows the spectral shape of the resonant circuit. This allows the spectral lines to be located in frequency space using an accurate low frequency source (e.g., a signal generator of about 32 kHz) and receiver need not rely on the accuracy of the 300 kHz "ring frequency" for tuning.

Note that one could drive the tank in a push-pull fashion using a complementary pair of FETs or some other switch arrangement. This would give control of the phase (one can start the push-pull at a predetermined point such as ground) and of the "resonant" frequency (actually determined by the push-pull rate, but is more energy efficient if it is matched to the resonant frequency of the antenna and lumped complex element), and will provide a high resolution clock source for the pulse-to-pulse timing required to hold the spectral lines in a predictable place. The two implementations accomplish the same thing, but push-pull takes extra parts to accurately generate the 300 kHz "resonant frequency", and is not terribly power efficient. The potential benefit of the push-pull is that one can control the shape of the spectrum, which then could give more predictable signal amplitude.

So, for example, the transmitter generates a group of pulses spaced 32 kHz apart, each group being (for example) 12.5 milliseconds long (which in this example provides about 400 pulses). Then, for 12.5 milliseconds, for example, the transmitter sends nothing, and then transmits another 12.5 milliseconds of pulses at 32 kHz, and so on. The time domain signal that results is a group of 400 pulses repeating at a 40 Hz rate. The receiver then bandpass filters the received signal, and "tunes" the receiver to the expected spectral line (e.g., in this continuing example, to 288 kHz, which is the ninth harmonic of 32 kHz). Next, the receiver down converts the signal and band pass filters the signal at 32 kHz, for example. The receiver then down converts the signal again with an intermediate frequency (in this example) of about 32 kHz to isolate the 40 Hz signal, which is then filtered and envelope detected. The result is a train of pulses (a digital output) that is at 40 Hz.

Synchronization of the transmit section of a repeater to the received signal is accomplished by using a conventional edge detector on the 40 Hz digital output to indicate the time at which the received 40 Hz pulse train began and using this information to start the repeater's transmitted pulse train coincidently. To prevent individual repeater time inaccuracies from aggregating to the point where synchronization is lost, each repeater in the system is limited to transmitting for a limited period of time, for example 5 seconds, after which it will stop transmission and wait to be "re-activated" by another incoming signal. The transmit and stop transmitting times are determined by optimizations that include among others, system range, accuracy of the individual time sources of the repeaters, and the pulse repetition rate.

To reduce the probability of false positive alarm signals, this sequence can be further encoded by sending the emergency signal at "40 Hz", for example, for a period of time, then switching the emergency signal to 50 Hz, for example, and so on as described above. Thus, the transmitter transmits a "predetermined pattern" in a way that permits carrier phase synchronization, which in turn allows the communication system to synchronize multiple transmitters. One could also frequency shift key the transmission signal by changing the 32 kHz repetition rate and thusly provide additional message encoding While the above embodiments have been described as an analog receiver, synchronizer and transmitter, these functions could be implemented digitally. For example, the receiver could include an antenna, a transformer, an amplifier, and analog-to-digital converter and a digital signal processor, or other general-purpose computing device. The transmitter and synchronizer could also be implemented digitally. In the case of a digital implementation, care must be taken to accounting for the addition of computer delays.

Although various embodiments are specifically illustrated and described herein, it will be appreciated that modifications and variations of the invention are covered by the above teachings and are within the purview of the appended claims without departing from the spirit and intended scope of the invention. For example, certain carrier frequencies and repetition patterns are discussed, however, other carrier frequencies and repetition patterns could be employed without departing from the scope of the present invention. Furthermore, these examples should not be interpreted to limit the modifications and variations of the invention covered by the claims but are merely illustrative of possible variations.

The invention claimed is:

1. A method for communicating an emergency signal comprising:

varying a repetition rate of an unmodulated long-wave carrier in an on/off keyed manner in a predetermined sequence and at a predetermined phase angle;

generating an electromagnetic wave with a resulting signal in which a primary propagation mode is a magnetic field with a reduced electric field; and transmitting a resulting signal as the emergency signal.

2. The method according to claim 1, further comprising:

monitoring one or more transmission on the carrier for the predetermined sequence; and activating an alarm system upon determining a match of the predetermined sequence in one of the one or more transmissions.

3. The method according to claim 1, further comprising:

repeating the resulting signal with one or more repeaters synchronized in timing and phase to the resulting signal.

4. The method according to claim 1, wherein the predetermined sequence comprises a first repetition rate having a first frequency for a first predetermined period, followed by a second repetition rate of a second frequency for a second predetermined period, followed by a third repetition rate of a third frequency for a third predetermined period, followed by no signal for a fourth predetermined period.

5. A method for communicating an emergency signal comprising:

transmitting an alarm sequence as a predetermined repeating on/off sequence of a predetermined unmodulated longwave frequency at a predetermined phase angle using a magnetic field as a primary mode of propagation and with a reduced electric field;

identifying by one or more repeaters the alarm sequence;

synchronizing the one or more repeaters to the alarm sequence; and rebroadcasting the alarm sequence from the one or more repeaters in synchronism with a source of the alarm sequence.

6. The method according to claim 5, further comprising:

activating an alarm response system upon determining a match of the predetermined sequence in one of the one or more transmissions.

7. The method according to claim 5, further comprising:

transmitting a response to the alarm sequence upon receipt by an emergency response system; and resetting one or more repeaters and a source transmitter upon receipt of the response.

8. The method according to claim 5, wherein the predetermined frequency transmission medium includes a sonic wave.

9. The method according to claim 5, wherein the predetermined frequency includes a low frequency signal.

10. The method according to claim 5, wherein said transmitting further comprises:

transmitting the alarm sequence so that a predominant mode of the alarm sequence is transmitted via magnetic field.

11. The method according to claim 10, wherein said monitoring further comprises:

shielding a receiver from electric fields.

12. The method according to claim 10, wherein the low frequency signal includes a transmission carrier in a range from about 10 kilohertz to about 1000 kilohertz.

13. The method according to claim 5, wherein said transmitting further comprises:

transmitting the alarm sequence using an antenna; and driving the antenna with the predetermined frequency switched on and off in the predetermined sequence.

14. The method according to claim 13, wherein said monitoring further comprises:

receiving the alarm sequence using an antenna;

tuning complex impedance to the antenna of the receiver to develop a resonant circuit;

amplifying a band-limited output of the antenna;

detecting an envelope of the amplified output to provide an "on/off" keyed representation of the received alarm sequence;

converting the detected representation to a digital representation; and processing the digital representation to determine whether or not the received signals conform to the predetermined sequence that defines the alarm sequence.

15. The method according to claim 14, further comprising wherein said processing includes:

correlating a duration and a period of the digital representation with the predetermined sequence.

16. The method according to claim 14, further comprising:

retransmitting the alarm signal in synchronism with the original transmission should the pulse repetition patterns match those of an alarm sequence.

17. The method according to claim 14, further comprising:

driving a transformer with an output of the antenna in a receiver to reflect a resistance located on a secondary winding of the transformer back to a primary winding of the transformer to reduce a Q of the antenna without adding real resistance and thermal noise.

18. An apparatus for transmitting an emergency signal comprising:

a signal generator to generate an unmodulated longwave carrier signal at a predetermined frequency and a predetermined phase angle;

a switch coupled to the signal generator to interrupt the carrier signal in a predetermined sequence while maintaining the predetermined phase angle; and an antenna to radiate the interrupted carrier signal in the predetermined sequence and predetermined phase angle as the emergency signal using a magnetic field as a primary mode of propagation and with a reduced electric field.

19. An apparatus for receiving an emergency signal comprising:

a shielded antenna to receive a transmission at an unmodulated predetermined longwave carrier, said shielded antenna designed to generate a current primarily from a changing magnetic field, and said shielded antenna designed to limit electric fields around the antenna;

a receiver to monitor a predetermined longwave frequency and to output a digital sequence upon receiving a transmission on the predetermined longwave frequency, which digital sequence represents an on/off sequence detected in the predetermined frequency; and a processor to correlate the digital sequence against a predetermined sequence to identify the emergency signal.

20. The apparatus according to claim 19, wherein the receiver includes:

an amplifier to amplify a signal from the antenna; and a converter to convert the signal output by the antenna to the digital sequence.

21. The apparatus according to claim 20, wherein the receiver further comprises:

a transformer coupled to the antenna and creating a resonant circuit with the antenna at the predetermined frequency; and a shield disposed around at least the antenna to shield the antenna from electric fields.

22. The apparatus according to claim 21, wherein the receiver includes an envelop detector to detect an envelope of the signal output from the antenna, which is used by the converter to convert the signal to the digital sequence.

23. An apparatus for repeating an emergency signal comprising:

a receiver to monitor a predetermined longwave frequency and to output a digital sequence upon receiving a transmission on the predetermined longwave frequency, which digital sequence represents an on/off sequence detected in the predetermined frequency, said receiver including a processor to correlate the received digital sequence against a predetermined sequence to identify the emergency signal;

a transmitter including:

a signal generator coupled to the processor to generate a signal at the predetermined longwave frequency and a predetermined phase angle upon an identification of the emergency signal by the processor;

a switch coupled to the signal generator to cause a signal output by the signal generator to be switched on and off in the predetermined sequence and the predetermined phase angle; and an antenna to reradiate the predetermined signal in the predetermined sequence as the emergency signal using a magnetic field as a primary mode of propagation and with a reduced electric field; and a synchronizer coupled to the switch in the transmitter to synchronize the predetermined sequence generated at the output of the switch with the received digital sequence and to synchronize a phase of the carrier signal output from the signal generator with a phase of a carrier signal received by the receiver.

24. A communication system for communicating an emergency signal comprising:

a transmitter for transmitting an initial emergency signal, said transmitter including:

a signal generator to generate a signal at a predetermined longwave frequency and a predetermined phase angle;

a switch coupled to the signal generator to cause the signal to be interrupted in a predetermined sequence and the predetermined phase angle; and an antenna to radiate the interrupted signal in the predetermined sequence and predetermined phase angle as the emergency signal at a longwave frequency using a magnetic field as a primary mode of propagation and with a reduced electric field; one or more repeaters, each of said one or more repeaters including:

a receiver to monitor the predetermined longwave frequency and to output a digital sequence upon receiving a transmission on the predetermined longwave frequency, which digital sequence represents an on/off sequence detected in the predetermined longwave frequency, said receiver including a processor to correlate the received digital sequence against a predetermined sequence to identify the emergency signal;

a transmitter including:

a signal generator coupled to the processor to generate a signal at the predetermined longwave frequency and the predetermined phase angle upon an identification of the emergency signal by the processor;

a switch coupled to the signal generator to cause the signal output by the signal generator to be interrupted in the predetermined sequence and the predetermined phase angle; and an antenna to reradiate the predetermined signal in the predetermined sequence and predetermined phase angle at a longwave frequency using a magnetic field as a primary mode of propagation and with a reduced electric field as the emergency signal; and a synchronizer coupled to the switch in the transmitter to synchronize the predetermined sequence generated at the output of the switch with a received digital sequence and to synchronize a phase of a carrier signal output from the signal generator with a phase of a carrier signal received by the receiver; and an alarm receiver to receive the emergency signal, said alarm receiver to monitor the predetermined longwave frequency and to output a digital sequence upon receiving a transmission on the predetermined longwave frequency, which digital sequence represents an on/off sequence detected in the predetermined longwave frequency, said receiver including a processor to correlate the received digital sequence against a predetermined sequence to identify the emergency signal.

* * * * *